(12) United States Patent
Goldstein et al.

(10) Patent No.: US 10,737,774 B2
(45) Date of Patent: Aug. 11, 2020

(54) UNMANNED AERIAL VEHICLE PROPELLER ASSEMBLY

(71) Applicant: GoPro, Inc., San Mateo, CA (US)

(72) Inventors: Ryan Michael Goldstein, Hidden Hills, CA (US); David Milton, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 275 days.

(21) Appl. No.: 15/906,706

(22) Filed: Feb. 27, 2018

(65) Prior Publication Data

US 2019/0210719 A1 Jul. 11, 2019

Related U.S. Application Data

(60) Provisional application No. 62/614,137, filed on Jan. 5, 2018.

(51) Int. Cl.
*B64C 27/473* (2006.01)
*B64C 39/02* (2006.01)
(Continued)

(52) U.S. Cl.
CPC ............ *B64C 27/473* (2013.01); *B64C 11/02* (2013.01); *B64C 27/08* (2013.01); *B64C 27/14* (2013.01);
(Continued)

(58) Field of Classification Search
CPC ....... B64C 11/02; B64C 27/32; B64C 39/024; B64C 2201/00–22; B64C 2201/024;
(Continued)

(56) References Cited

U.S. PATENT DOCUMENTS 5,215,356 A * 6/1993 Lin ..................... B60B 33/0042
16/30
8,147,203 B2 * 4/2012 Chen ..................... F04D 29/329
415/213.1
(Continued)

FOREIGN PATENT DOCUMENTS

WO WO-2017028503 A1 * 2/2017 ............. B64C 27/32

*Primary Examiner* — Justin D Seabe
*Assistant Examiner* — Christopher R Legendre
(74) *Attorney, Agent, or Firm* — Young Basile Hanlon & MacFarlane, P.C.

(57) ABSTRACT

Various embodiments of an unmanned aerial vehicle are disclosed. In some embodiments, the UAV includes a motor assembly rotatable about a rotation axis and a propeller hub assembly removably engageable with the motor assembly. The propeller hub assembly includes a retainer configured and dimensioned for engagement with the motor assembly such that rotation of the motor assembly causes corresponding rotation of the propeller hub assembly. The retainer includes a pair of deflectable arms resiliently repositionable between a first position and a second position, for engagement and disengagement with the motor assembly, respectively. The arms are movable inwardly towards the rotation axis from the first position to the second position upon application of an external force and movable outwardly away from the rotation axis from the second position to the first position upon removal of the external force.

16 Claims, 11 Drawing Sheets

(51) Int. Cl.
*B64C 11/02* (2006.01)
*B64C 27/14* (2006.01)
*B64C 27/08* (2006.01)

(52) U.S. Cl.
CPC ...... *B64C 39/024* (2013.01); *B64C 2201/024* (2013.01); *B64C 2201/042* (2013.01); *B64C 2201/127* (2013.01)

(58) Field of Classification Search
CPC ........ B64C 2201/042; B64C 2201/127; B64C 27/14; B64C 27/473; B64C 2201/108
See application file for complete search history.

(56) References Cited

U.S. PATENT DOCUMENTS

| | | | |
|---|---|---|---|
| 8,833,214 B2 * | 9/2014 | Wang | B25G 1/085 81/177.4 |
| 9,057,273 B2 | 6/2015 | Wang | |
| 9,079,115 B2 * | 7/2015 | Huang | A63H 27/02 |
| 9,221,537 B2 | 12/2015 | Wang | |
| D751,026 S | 3/2016 | Tao | |
| 9,284,040 B2 | 3/2016 | Wang | |
| 9,630,703 B2 | 4/2017 | Wang | |
| 10,519,773 B2 * | 12/2019 | Muren | B64C 11/04 |
| 2016/0186919 A1 | 6/2016 | Zhao | |
| 2017/0050983 A1 | 2/2017 | Ueda | |
| 2017/0152843 A1 | 6/2017 | Bei | |
| 2017/0160765 A1 | 6/2017 | Zhao | |
| 2017/0176840 A1 | 6/2017 | Zhou | |
| 2017/0221757 A1 | 8/2017 | Hsieh | |
| 2017/0222594 A1 | 8/2017 | Tao | |
| 2017/0233062 A1 | 8/2017 | Li | |
| 2017/0233063 A1 | 8/2017 | Zhao | |
| 2017/0240267 A1 | 8/2017 | Tao | |
| 2019/0039719 A1 * | 2/2019 | Baek | B64C 39/024 |
| 2019/0210719 A1 * | 7/2019 | Goldstein | B64C 11/02 |

* cited by examiner

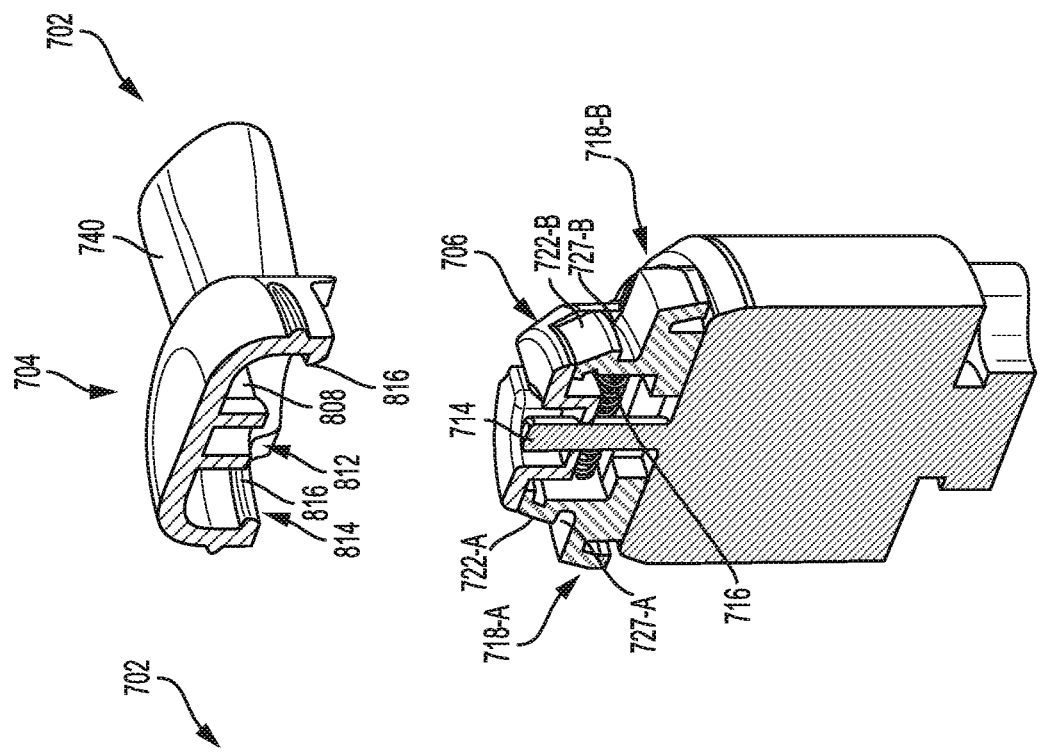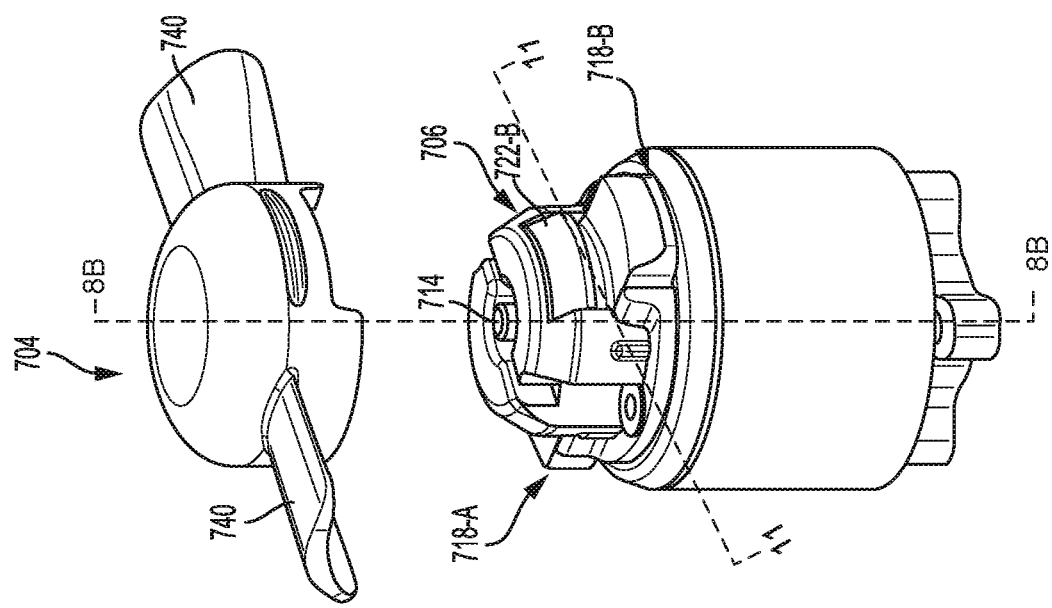

US 10,737,774 B2

UNMANNED AERIAL VEHICLE PROPELLER ASSEMBLY

CROSS REFERENCE TO RELATED APPLICATIONS

This application claims the benefit of U.S. Provisional Application No. 62/614,137, filed Jan. 5, 2018, the contents of which are incorporated by reference herein in its entirety.

TECHNICAL FIELD

This disclosure relates to Unmanned Aerial Vehicles (UAVs) and, in particular, to removable propeller assemblies for UAVs.

BACKGROUND

For aerial photography, a user may utilize a UAV to have freedom to move an imaging device about a subject and capture images from multiple directions. Many UAVs include propellers made of lightweight material(s) that can make them susceptible to damage, e.g., during storage and/or transport. To combat this issue, some UAVs include detachable propellers that can be removed prior to storage and/or transport to decrease the likelihood of damage. There remains a need, however, for structures and methods of attachment that increase the ease and convenience with which propellers can be removed from and connected to UAVs.

SUMMARY

In one aspect of the present disclosure, an unmanned aerial vehicle is disclosed that includes a motor assembly that is rotatable about a rotation axis and a propeller hub assembly that is removably engageable with the motor assembly. The propeller hub assembly includes a retainer that is configured and dimensioned for engagement with the motor assembly such that rotation of the motor assembly causes corresponding rotation of the propeller hub assembly. The retainer includes a pair of deflectable arms that are resiliently repositionable between a first position and a second position. In the first position, the arms are positioned for engagement with the motor assembly, and in the second position, the arms are positioned for disengagement with the motor assembly such that the propeller hub assembly can be removed from the motor assembly. The arms are movable inwardly (towards the rotation axis) from the first position to the second position upon the application of an external force, and are movable outwardly (away from the rotation axis) from the second position to the first position upon removal of the external force.

In certain embodiments, the motor assembly may include a motor and a motor cap covering the motor. In such embodiments, the motor cap may include first and second apertures that are configured and dimensioned to receive the arms.

In certain embodiments, the arms may each include an outwardly extending retention member that is configured and dimensioned for insertion into the first and second apertures formed in the motor cap such that the retention members are engageable with an inner surface of the motor cap to secure the propeller hub assembly to the motor assembly.

In certain embodiments, the retention members may each include a chamfered outer surface, and the first and second apertures may each include a corresponding chamfered inner surface. The chamfered outer surfaces of the retention members may be configured and dimensioned for contact with the chamfered inner surfaces of the first and second apertures to facilitate inward deflection of the arms and insertion of the retention members into the first and second apertures formed in the motor cap.

In certain embodiments, the propeller hub assembly may further include a first hub member, a second hub member that is spaced from the first hub member, and a spacer that is positioned between the first and second hub members so as to define first and second receiving spaces.

In certain embodiments, the retainer may further include a bridge member connecting the arms, e.g., the arms and the bridge member may be unitarily formed.

In certain embodiments, the first hub member may define a recess that is configured and dimensioned to receive the bridge member of the retainer such that rotation of the retainer via engagement with the motor cap causes corresponding rotation of the first and second hub members.

In certain embodiments, the unmanned aerial vehicle may further include a first propeller having an end portion that is configured and dimensioned for positioning within the first receiving space, and a second propeller having an end portion that is configured and dimensioned for positioning within the second receiving space.

In certain embodiments, the second hub member may further include at least one stop member, and the motor cap may include an aperture that is configured and dimensioned to receive the stop member. In another aspect of the present disclosure, a propeller hub assembly is disclosed for use with an unmanned aerial vehicle including a motor assembly. The propeller hub assembly includes a retainer that is configured and dimensioned for engagement with the motor assembly such that rotation of the motor assembly causes corresponding rotation of the propeller hub assembly. The retainer includes a pair of deflectable arms that are resiliently repositionable between a first position, wherein the arms are positioned for engagement with the motor assembly, and a second position, wherein the arms are positioned for disengagement with the motor assembly such that the propeller hub assembly can be removed from the motor assembly. The arms are deflectable towards one another during movement from the first position to the second position upon application of an external force to the arms, and are movable away from one another during movement from the second position to the first position upon removal of the external force.

In certain embodiments, the arms may each include an outwardly extending retention member that is configured and dimensioned for engagement with an inner surface of the motor assembly.

In certain embodiments, the retention members may each include a tapered configuration to facilitate engagement with the motor assembly.

In certain embodiments, the propeller hub assembly may further include a first hub member, a second hub member that is spaced from the first hub member, and a spacer that is positioned between the first and second hub members so as to define a first and second receiving spaces.

In certain embodiments, the retainer may further include a bridge member connecting the arms, e.g., the bridge member and the arms may be unitarily formed.

In certain embodiments, the first hub member may define a recess that is configured and dimensioned to receive the bridge member of the retainer such that rotation of the retainer via engagement with a motor cap causes corresponding rotation of the first and second hub members. In another aspect of the present disclosure, a propeller hub assembly is disclosed for use with an unmanned aerial vehicle including a motor assembly. The propeller hub assembly includes first and second members that are resiliently repositionable between a first position, wherein the members are positioned to secure the propeller hub assembly to the motor assembly, and a second position, wherein the members are positioned such that the propeller hub assembly can be removed from the motor assembly. The first and second members are movable towards one another during movement from the first position to the second position upon application of an external force to the members, and are movable away from one another during movement from the second position to the first position upon removal of the external force.

In certain embodiments, the first and second members may each be configured as a resiliently deflectable arm. In such embodiments, the arms may each create a biasing force upon application of the external force that moves the arms from the second position to the first position.

In certain embodiments, the propeller hub assembly may further include at least one biasing member, e.g., one or more springs, that is positioned between the first and second members to move the first and second members from the second position to the first position.

BRIEF DESCRIPTION OF THE DRAWINGS

The disclosed embodiments have other advantages and features that will be more readily apparent from the detailed description, the appended claims, and the accompanying figures. A brief introduction of the figures is below.

FIG. 8A is a perspective view of the propeller assembly shown in FIG. 7 with a detached propeller hub.

FIG. 8B is a longitudinal, cross-sectional view of the propeller assembly shown in FIG. 8A taken along line 8B.

DETAILED DESCRIPTION

Figure 1:
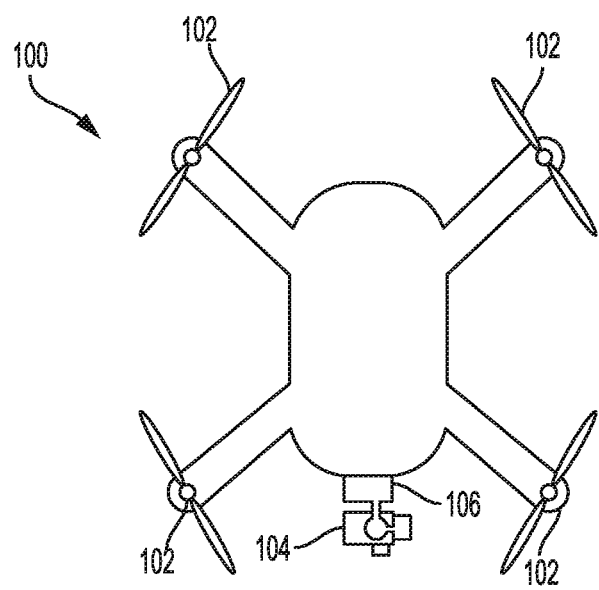
FIG. 1 is a top view of an exemplary UAV.

As discussed in further detail below, various embodiments of a propeller assembly are disclosed herein. The presently disclosed propeller assemblies include a propeller hub that can be removed from and connected to the body of the propeller assembly via manually actuated members.

Various embodiments of the present disclosure will now be described in detail with reference to the accompanying drawings as illustrative examples to enable those skilled in the art to practice the technology. The embodiments described below and shown in the drawings are not meant to limit the scope of the present disclosure to a single implementation or embodiment. Alternative implementations, embodiments, arrangements, and combinations of components are envisioned and are within the scope of the present disclosure. Wherever convenient, the same reference numbers will be used throughout the written description and the drawings to refer to same or like parts.

FIG. 1 illustrates an exemplary unmanned aerial vehicle (UAV) 100. In the illustrated embodiment, the UAV 100 includes four propeller assemblies 102. It should be appreciated, however, that in alternate embodiments, the number of propeller assemblies 102 may be increased or decreased without departing from the scope of the present disclosure.

The UAV 100 may be any form of aerial vehicle. In the embodiment illustrated in FIG. 1, for example, the UAV 100 is configured to perform aerial photography/video, and thus, includes an imaging device 104 that may provide still and/or video images by means of a communication link (not shown) to a ground-based user. To increase the capabilities of the UAV 100, it is envisioned that the imaging device 104 may be secured to the UAV 100 by a movement mechanism 106.

The UAV 100 may include a power source (not shown), such as battery pack, for example, that may be mounted on or secured to the UAV 100 in any suitable location to supply electrical power to the propeller assemblies 102, flight electronics (not shown) associated with operation of UAV 100, and/or the imaging device 104.

With reference now to FIGS. 2-6, one embodiment of the presently disclosed propeller assemblies 102 will be discussed. Throughout the following disclosure, and in FIGS. 2-6, only a single propeller assembly 102 will be described and shown for simplicity.

The propeller assembly 102 includes a propeller hub assembly 202 (FIG. 2) that is rotatable about an axis Y, two or more propeller blades 204 that are releasably connectable to the propeller hub assembly 202, and a motor assembly 206. In the illustrated embodiment, the propeller blades 204 are shown as being connected to the propeller hub assembly 202 by fasteners 207 in the form of attachment pins. It should be appreciated, however, that in alternate embodiments, the propeller blades 204 may be connected to the propeller hub assembly 202 using any suitable structure, such as, screws, snaps, and the like. Additionally, it should be appreciated that the propeller blades 204 may be integrally formed with the propeller hub assembly 202 in alternate embodiments without departing from the scope of the present disclosure.

As will be discussed in detail below, the propeller hub assembly 202 is configured and dimensioned for releasable connection to the motor assembly 206 to permit detachment of the propeller hub assembly 202, and thus, the propeller blades 204 (e.g., to permit storage and/or transport). The propeller hub assembly 202 includes a central aperture 208 that receives a motor shaft 209, an upper hub member 302, a lower hub member 304, a spacer 306, and a retainer 308. It is envisioned that the various components of the propeller hub assembly 202 may be formed as discrete structures, or alternatively, that one or more components of the propeller hub assembly 202 may be integrally formed, such as, for example, by injection molding or 3D printing. For example, the upper hub member 302 and the lower hub member 304 may be integrally formed with the spacer 306, and the retainer 308 may be integrally formed with the upper hub member 302. When formed as discrete structures, the upper hub member 302, the lower hub member 304, the spacer 306, and the retainer 308 may be connected through the use of any suitable structures and methods, such as through the use of mechanical connectors, e.g., screws, nails, rivets, or the like, and/or through the use of an adhesive, either individually or in combination. For example, it is envisioned that the upper hub member 302 and the lower hub member 304 may be fixedly connected to the spacer 306, and that the retainer 308 may be fixedly connected to the upper hub member 302.

Figure 2:
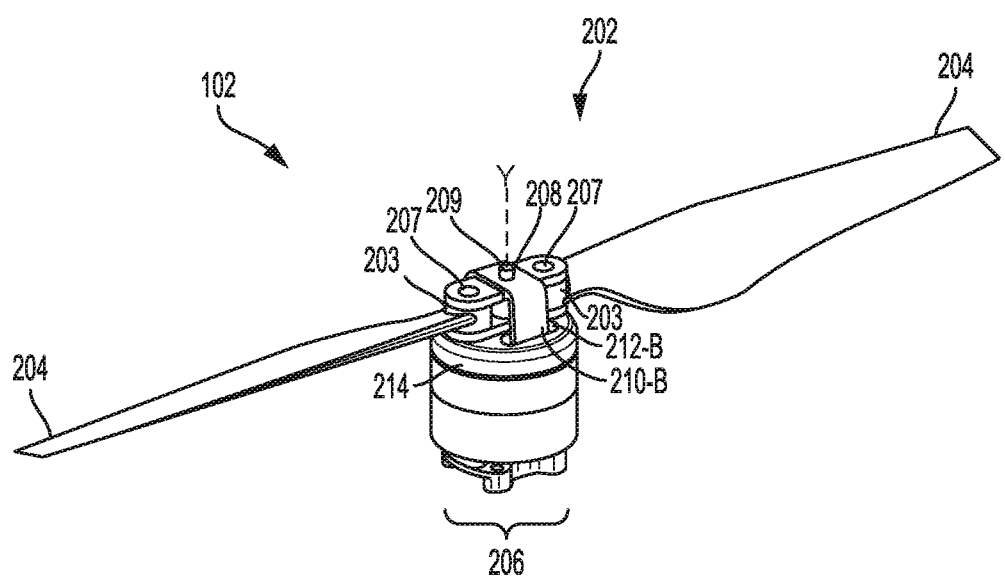
FIG. 2 is a perspective, side view of one embodiment of a propeller assembly for use with a UAV in accordance with the principles of the present disclosure.
Figure 3:
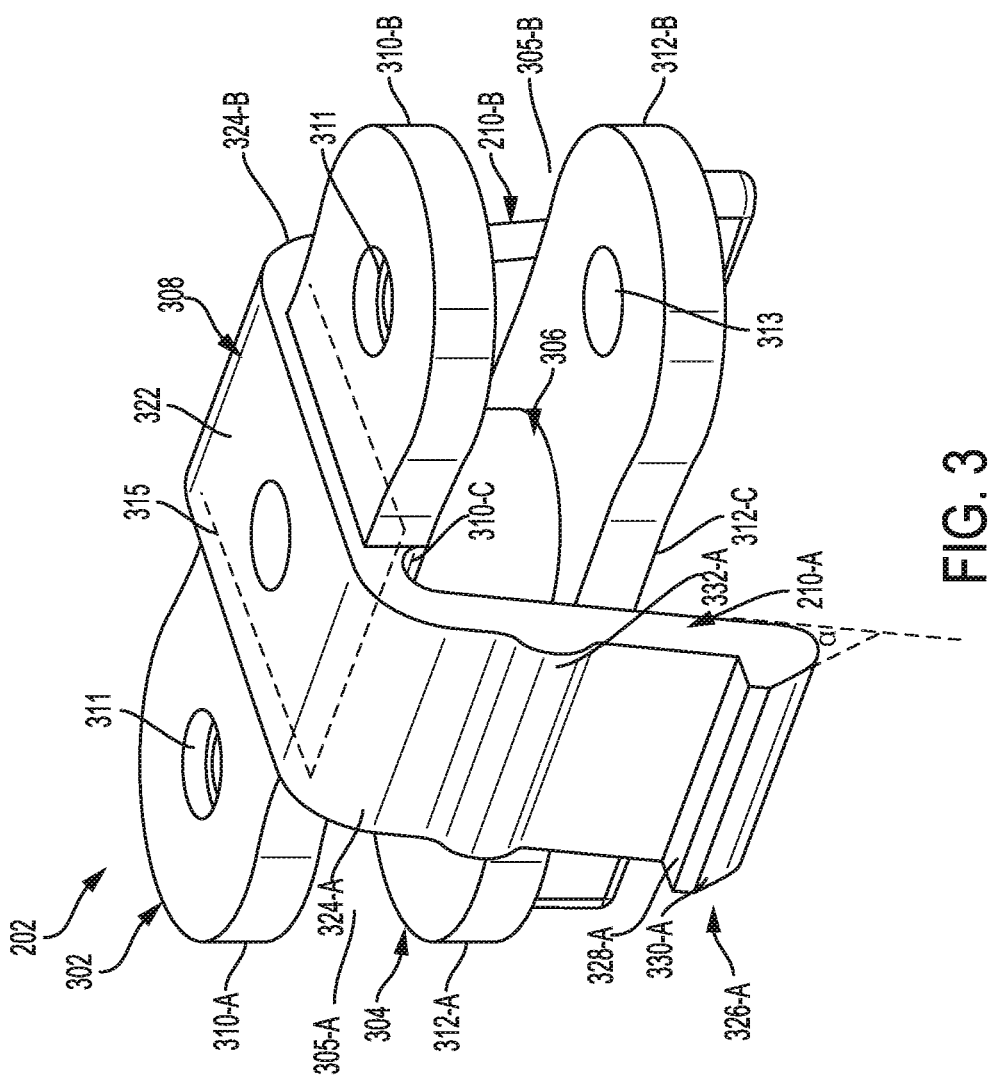
FIG. 3 is a partial, perspective, side view of the propeller assembly seen in FIG. 2 illustrating upper and lower hub members together with a spacer and a retainer in accordance with an embodiment of the present disclosure.
Figure 4:
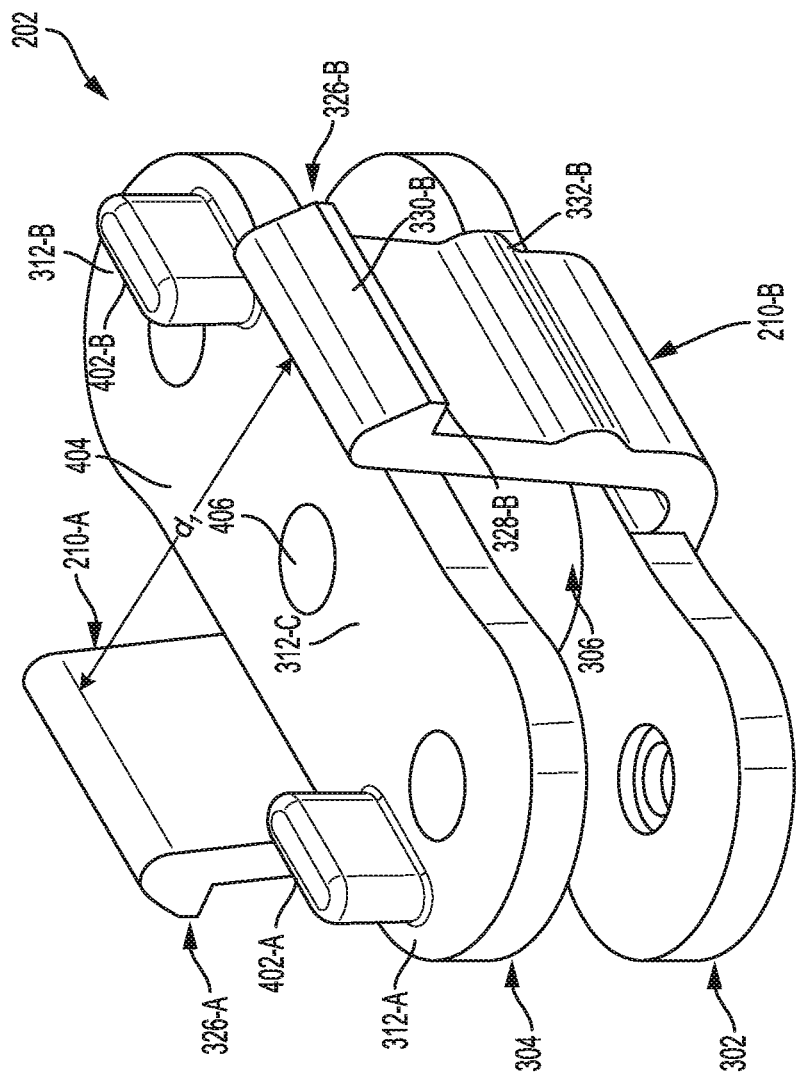
FIG. 4 is a perspective, bottom view of the structures shown in FIG. 3.

As seen in FIGS. 3 and 4, the retainer 308 is configured and dimensioned to removably connect the propeller hub assembly 202 to the motor assembly 206 (FIG. 2). In certain embodiments, discussed herein below, it is envisioned that the retainer 308 may be configured and dimensioned to permit single-handed use to increase the ease with which the propeller hub assembly 202 can be removed from and attached to the motor assembly 206.

The retainer 308 includes deflectable arms (members) 210-A, 210-B that are connected by a bridge member 322. The arms 210-A, 210-B include retention members 326-A, 326-B (FIGS. 3, 4), respectively, that extend outwardly from the arms 210-A, 210-B, i.e., away from the rotation axis Y. The retention members 326A, 326B are configured and dimensioned for insertion into corresponding apertures 212-A, 212-B (FIG. 5) respectively formed in a motor cap 214 of the motor assembly 206.

Figure 6:
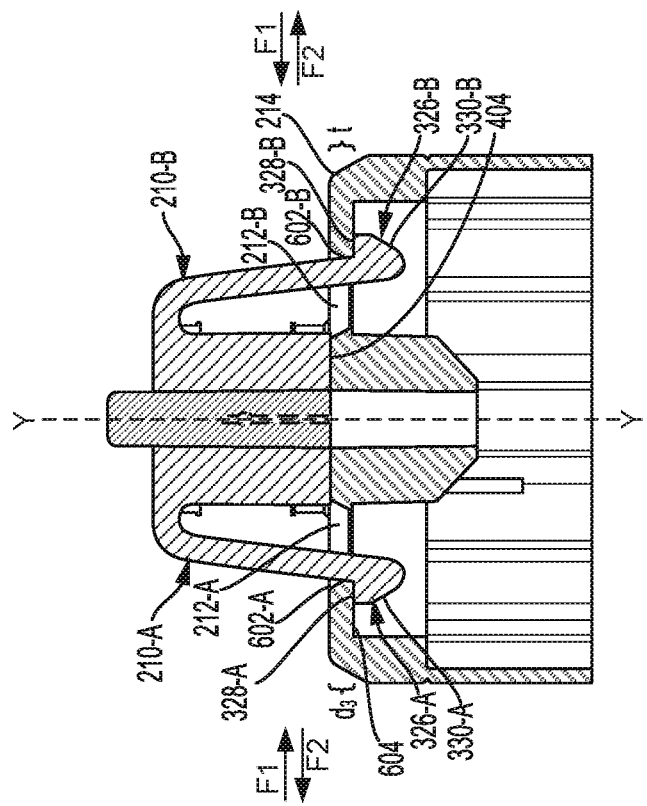
FIG. 6 is a longitudinal cross-sectional view of the motor assembly shown in FIG. 5 taken along line 6 together with the upper and lower hub members, the spacer, and the retainer shown in FIG. 3.

The deflectable arms 210-A, 210-B are formed from a resilient material, such as plastic(s) or polymer(s), for example, to permit resilient deflection upon the application of an external force F1 (FIG. 6) by the user. More specifically, the arms 210-A, 210-B are inwardly movable (towards the axis of rotation Y) from an unbiased (initial) position (FIG. 4) to a biased (subsequent) position (FIG. 6). In the unbiased position, the retention members 326-A, 326-B of the arms 210-A, 210-B define a distance $d_1$ (FIG. 4) greater than a distance $d_2$ (FIG. 5) separating the apertures 212-A, 212-B formed in the motor cap 214. However, upon application of the force F1 (by the user, for example), the arms 210-A, 210-B are deflected towards one another such that the distance $d_1$ is reduced. Inward deflection of the arms 210-A, 210-B not only facilitates insertion of the retention members 326-A, 326-B into the apertures 212-A, 212-B (FIG. 5), but creates a biasing force F2 (FIG. 6) that is directed outwardly (away from the axis of rotation Y), i.e., in a direction opposite to that of the force F1.

To facilitate inward deflection of the arms 210-A, 210-B, it is envisioned that the retainer 308 may further include spring portions 324-A, 324-B positioned between the bridge member 322 and the arms 210-A, 210-B. Although illustrated as being curvate in configuration in the illustrated embodiment, the spring portions 324-A, 324-B may be linear, e.g., L-shaped, in alternate embodiments of the present disclosure. As seen in FIGS. 3, 4, and 6, for example, the retainer 308 is configured and dimensioned such that the retention members 326-A, 326-B of the arms 210-A, 210-B extend vertically below the lower hub member 304 (e.g., by one to five millimeters) to facilitate positioning of the retention members 326-A, 326-B within the apertures 212-A, 212-B in the manner discussed above.

To facilitate insertion of the retention members 326-A, 326-B into the apertures 212-A, 212-B, respectively, it is envisioned that the retention members 326-A, 326-B may include a tapered configuration. Specifically, as can be appreciated through reference to FIGS. 3 and 4 in particular, the retention members 326-A, 326-B may respectively include chamfered outer walls 330-A, 330-B that extend at an angle $\alpha$ (e.g., within the range of 30°-75°) in relation to a longitudinal axis along which the lengths of the arms 210-A, 210-B extend. It is envisioned that the apertures 212-A, 212-B formed in the motor cap 214 may include inner walls 602-A, 602-B (FIG. 6) with corresponding chamfered surfaces to further facilitate insertion of the retention members 326-A, 326-B by initially guiding the retention members 326-A, 326-B via engagement of the outer walls 330-A, 330-B and the chamfered surfaces of the inner walls 602-A, 602-B, and enhancing deflection of the arms 210-A, 210-B caused by application of the external force F1, if required.

To facilitate proper application of the force F1, in certain embodiments, the arms 210-A, 210-B may include tactile members 332-A, 332-B (FIGS. 3, 4), respectively, which may be configured as raised projections, ribs, and/or textured section of the arms 210-A, 210-B.

Following insertion of the retention members 326-A, 326-B into the apertures 212-A, 212-B (FIG. 5), the force F1 is removed (e.g., by release of the arms 210-A, 210-B), and the force F2 is exerted upon the walls of the motor cap 214 defining the apertures 212-A, 212-B to facilitate retention of the arms 210-A, 210-B by the motor cap 214. To further facilitate retention of the arms 210-A, 210-B, and guard against inadvertent removal, the retention members 326-A, 326-B may define surfaces 328-A, 328-B (FIGS. 3, 4) that are positionable beneath, and are configured and dimensioned for engagement with, an inner surface 604 (FIG. 6) of the motor cap 214. To remove the propeller hub assembly 202, the external force F1 is reapplied to the arms 210-A, 210-B to approximate the retention members 326-A, 326-B until such time that the retention members 326-A, 326-B can be withdrawn from the apertures 212-A, 212-B.

As seen in FIG. 6, a distance $d_3$ is defined between a bottom surface 404 of the lower hub member 304 and the surfaces 328-A, 328-B of the retention members 326-A, 326-B, respectively, that is approximately equal to the thickness t of the motor cap 214. By adhering to tight manufacturing tolerances, and closely approximating the distance $d_3$ and the thickness t, undesirable movement (e.g., shaking) of the propeller hub assembly 202 during operation of the UAV 100 can be reduced or eliminated.

As previously discussed, the propeller hub assembly 202 is configured to retain two or more propeller blades 204 (FIG. 2). In the embodiment shown in FIGS. 2-6, the upper hub member 302 includes opposing end portions 310-A, 310-B each defining an aperture 311 that is configured and dimensioned to receive a fastener 207 (FIG. 2), and an intermediate portion 310-C separating the end portions 310-A, 310-B including an aperture (not shown) that is configured and dimensioned to receive the motor shaft 209 (FIG. 2). In certain embodiments, such as that illustrated in FIG. 3, the upper hub member 302 defines a recess 315 adjacent the intermediate portion 310-C that is configured and dimensioned to receive the retainer 308 such that the bridge member 322 is seated within the recess 315 upon assembly. Receipt of the retainer 308 within the recess 315 facilitates concomitant rotation of the components of the propeller hub assembly 202 such that the propeller hub assembly 202 rotates as a unit.

In alternative embodiments, it is envisioned that the retainer 308 may be integrally formed with the upper hub member 302, as discussed above, or that the retainer 308 may be removably or fixedly coupled to the upper hub member 302, e.g., by one or more mechanical fasteners (not shown).

The lower hub member 304 includes opposing end portions 312-A, 312-B, each defining an aperture 313 that is configured and dimensioned to receive a fastener 207 (FIG. 2), and an intermediate portion 312-C separating the end portions 312-A, 312-B that includes an aperture 406 (FIG. 4) that is configured and dimensioned to receive the motor shaft 209 (FIG. 2). As seen in FIG. 4, the lower hub member 304 further includes one or more stop members 402-A, 402-B that extend vertically downward from the bottom surface 404 of the lower hub member 304. More specifically, in the embodiment shown in FIG. 4, the lower hub member 304 includes a stop member 402-A positioned adjacent the end portion 312-A and a stop member 402-B positioned adjacent the end portion 312-B. Although illustrated as including a pair of stop members 402-A, 402-B in FIG. 4, it should be appreciated that the number of stop members 402, and the specific location of the stop members 402, may be varied in alternate embodiments of the disclosure. The stop members 402-A, 402-B are configured and dimensioned for positioning within apertures 506-A, 506-B (FIG. 5) respectively formed in the motor cap 214. It is envisioned that the stop member 402-A, 402-B and the apertures 506-A, 506-B may correspond in configuration and dimensions to increase the mechanical engagement between the motor assembly 206 and the propeller hub assembly 202 and the transfer of rotational energy from the motor assembly 206 to the propeller hub assembly 202, and thus, limit the application of torsional forces to the motor shaft 209. For example, it is envisioned that the apertures 506-A, 506-B may be configured and dimensioned to receive the respective stop members 402-A, 402-B in an interference fit.

In certain embodiments, each of the propeller assemblies 102 included on the UAV 100 may be identical in configuration. Alternatively, however, the UAV may include propeller assemblies 102 that are configured for rotation in opposing directions (i.e., the UAV 100 may include propeller assemblies 102 that are configured to rotate clockwise as well as propeller assemblies 102 that are configured to rotate counterclockwise). In such embodiments, the orientations of the stop members 402-A, 402-B (FIG. 4) and the apertures 506-A, 506-B may be varied so as to ensure connection of the propeller assemblies 102 to the corresponding motor assembly 206.

With reference again to FIGS. 3 and 4, the hub members 302, 304 and the spacer 306 are configured and dimensioned such that the motor shaft 209 is extendable through the lower hub member 304, through the spacer 306, and into the upper hub member 302. The spacer 306 is configured and dimensioned for positioning between the end portions 310-A, 310-B of the upper hub member 302 and the end portions 312-A, 312-B of the lower hub member 304, and includes an aperture (not shown) that is configured and dimensioned to receive the motor shaft 209 (FIG. 2). More specifically, the spacer 306 is configured to separate the hub members 302, 304 so as to create receiving spaces 305-A, 305-B (FIG. 3) for receipt of end portions 203 (FIG. 2) of the propeller blades 204. For example, in one particular embodiment, the spacer 306 defines a height substantially within the range of one centimeter to ten centimeters. Upon connection of the propeller hub assembly 202 and the propeller blades 204, as can be appreciated through reference to FIGS. 2-4, the fasteners 207 may be inserted into the apertures 311, 313 for passage through corresponding openings (not shown) formed in the end portions 203 of the propeller blades 204.

Figure 5:
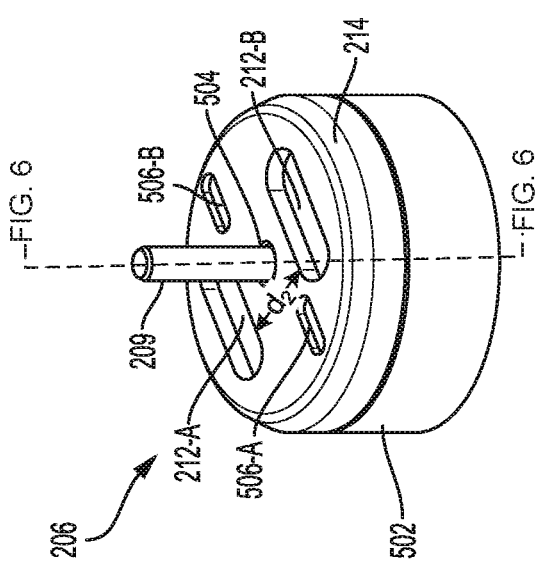
FIG. 5 is a partial, perspective top view of a motor assembly of the UAV shown in FIG. 1 according to one embodiment of the present disclosure.

With particular reference to FIGS. 5 and 6, the motor assembly 206 will be discussed. In addition to the aforementioned motor shaft 209 and motor cap 214, the motor assembly further includes a motor housing 502 that accommodates a motor (not shown). The motor shaft 209 extends vertically from the motor (not shown) through an aperture 504 formed in the motor housing 502 so as to define the axis of rotation Y (FIG. 6).

With reference now to FIGS. 7-12B, an alternative embodiment of the presently disclosed propeller hub assembly will be discussed, which is identified by the reference character 702. The propeller hub assembly 702 includes a propeller hub 704, a latch cap 706, a spring latch mechanism 708, and a motor assembly 710 including a motor shaft 714 that is rotatable about an axis of rotation Y.

The propeller hub 704 includes a body 742, and two or more propellers 740. It is envisioned that the propellers 740 may be integrally formed with the body 742 of the propeller hub 704, or alternatively, that the propellers 740 may be configured and dimensioned for mechanical connection to the body 742 (e.g., via one or more fasteners, such as screws). As discussed above, the propeller hub assembly 702 may be configured for clockwise or counter-clockwise rotation. To facilitate proper assembly, the latch cap 706 may be configured to only receive propeller hubs 704 configured for rotation in a particular direction, as discussed in further detail below. The propeller hub 704 further includes stops 808 (FIG. 8B) depending from an inner surface thereof, and a hollow 812 (FIG. 8B) that is configured and dimensioned to receive the motor shaft 714. More specifically, the hollow 812 defines an annular opening having a diameter that approximates that of the motor shaft 714. For example, it is envisioned that the hollow 812 may be configured and dimensioned to receive the motor shaft 714 in an interference fit in certain embodiments.

The latch cap 706 is positioned about the spring latch mechanism 708 to secure the spring latch mechanism 708 in relation to the motor assembly 710. It is envisioned that the latch cap 706 may be removably connectable to the motor assembly 710 by one or more fasteners 712 (e.g., screws). Alternatively, it is envisioned that the latch cap 706 may be fixedly coupled to, or integrally formed with, the motor assembly 710. The latch cap 706 further includes an aperture 802 defining a cavity 804, a slot 806 that extends laterally (i.e., transversely) in relation to the rotation axis Y (FIG. 7), and extensions 1208 (FIGS. 11A, 11B) that extend inwardly towards the spring latch mechanism 708. The slot 806 is configured and dimensioned to receive the stops 808 (FIG. 8B) depending from the propeller hub 704. As will be discussed in greater detail below, the slots 806 and the stops 808 may assume a first configuration when associated with propeller hub assemblies 702 intended for clockwise rotation and a second, different configuration when associated with propeller hub assemblies 702 intended for counterclockwise rotation to facilitate proper assembly.

The spring latch mechanism 708 is configured and dimensioned to facilitate attachment and removal of the propeller assembly 704 from the propeller hub assembly 702. In certain embodiments, discussed herein below, it is envisioned that the spring latch mechanism 708, and the components thereof, may be configured and dimensioned to permit single-handed attachment and removal of the propeller assembly 704.

Figure 7:
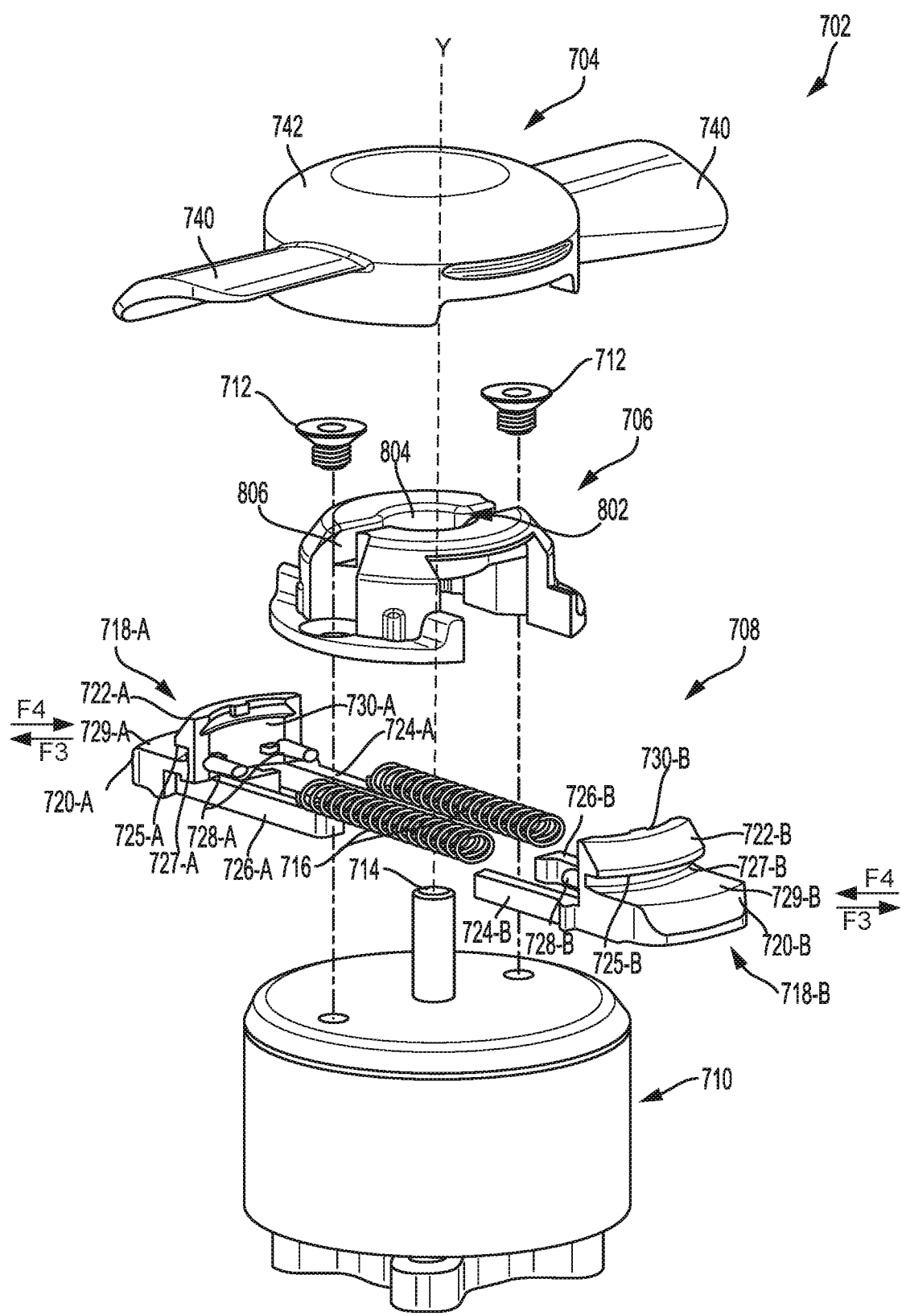
FIG. 7 is an exploded, perspective view of an alternate embodiment of a propeller assembly in accordance with the principles of the present disclosure.
Figure 9B:
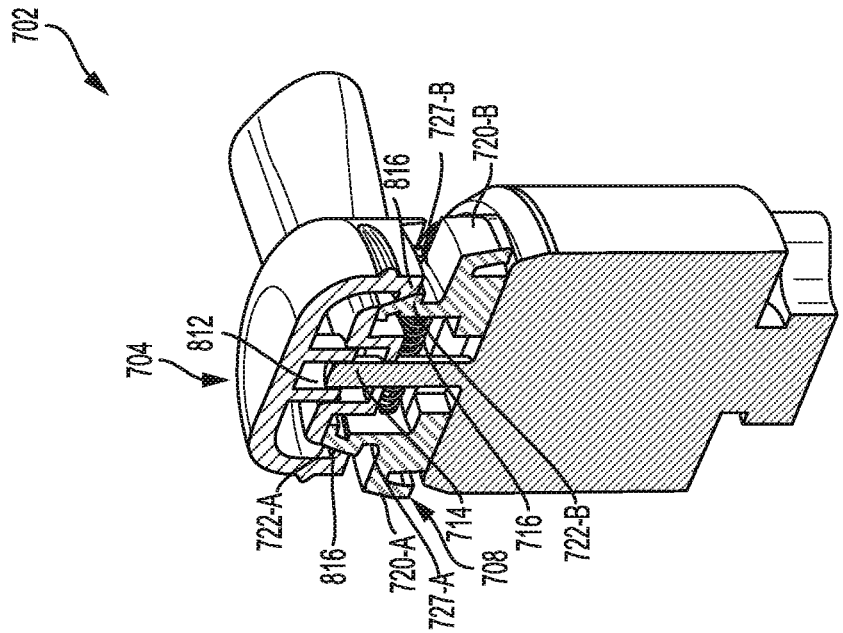
FIG. 9B is a longitudinal, cross-sectional view of the propeller assembly shown in FIG. 9A taken along line 9B.
Figure 9A:
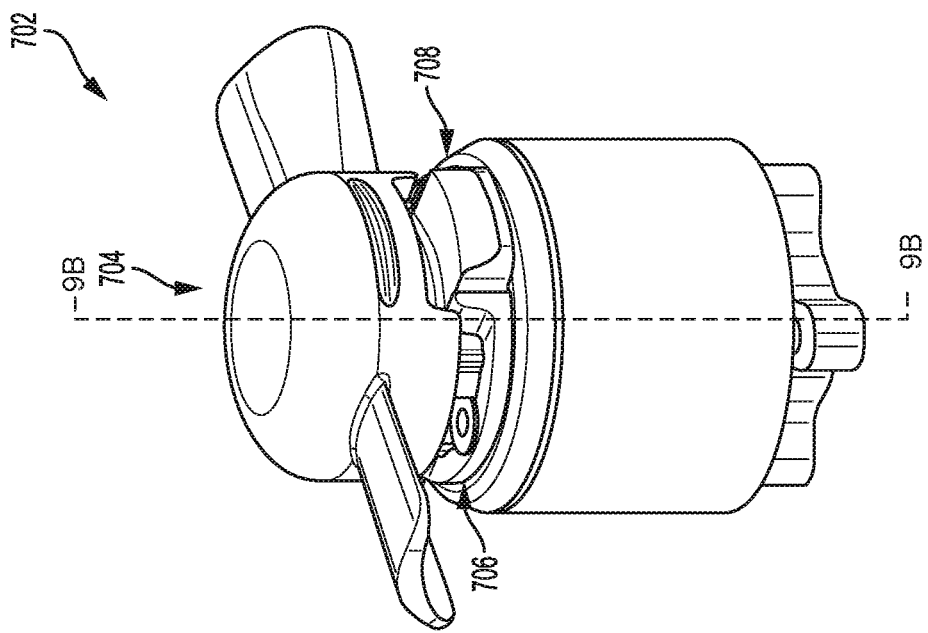
FIG. 9A is a perspective, side view illustrating partial assembly of the propeller assembly shown in FIG. 7.

In embodiment illustrated in FIGS. 7-12B, the spring latch mechanism 708 includes one or more biasing members 716 (e.g., springs) interposed between two repositionable disengagement members configured as buttons 718-A, 718-B. The buttons 718-A, 718-B respectively include tactile members 720-A, 720-B configured and dimensioned for manual engagement, angled (tapered) guiding surfaces 722-A, 722-B (e.g., a chamfered outer wall), connecting members 724-A, 724-B, stop members 726-A, 726-B, and mounting members 728-A, 728-B. To increase ease of assembly and reduce manufacturing costs, it is envisioned that the buttons 718-A, 718-B may be identical in configuration and dimensions, as shown in FIG. 7, for example. Additionally, while shown and described as including pairs of biasing members 716, buttons 718, and mounting members 728, it should be appreciated that, in alternate embodiments, the biasing members 716, the buttons 718, and the mounting members 728 may be present in greater or few number without departing from the scope of the present disclosure. For example, the spring latch mechanism 708 may include a single button 718 movable in relation to a static member, wherein movement is facilitated by a single biasing 716 positioned about a single mounting member 728. It is further envisioned that the buttons 718-A, 718-B may be unitary in construction such that the various components thereof, i.e., the tactile members 720, the guiding surfaces 722, the connecting members, the stop members 726, and the mounting members 728 may be monolithically formed, such as, for example, by injection molding or 3D printing.

The guiding surfaces 722-A, 722-B respectively include overhangs 725-A, 725-B that define receiving spaces 727-A, 727-B located between the overhangs 725-A, 725-B and upper surfaces 729-A, 729-B of the buttons 718-A, 718-B.

The connecting members 724-A, 724-B, the stop members 726-A, 726-B, and the mounting members 728-A, 728-B extend laterally (i.e., transversely) in relation to the rotation axis Y from inner surfaces 730-A, 730-B of the buttons 718-A, 718-B, respectively. Additionally, as seen in FIG. 7, the tactile members 720-A, 720-B extend laterally beyond the respective guiding surface 722-A, 722-B to facilitate manual access.

Figure 10B:
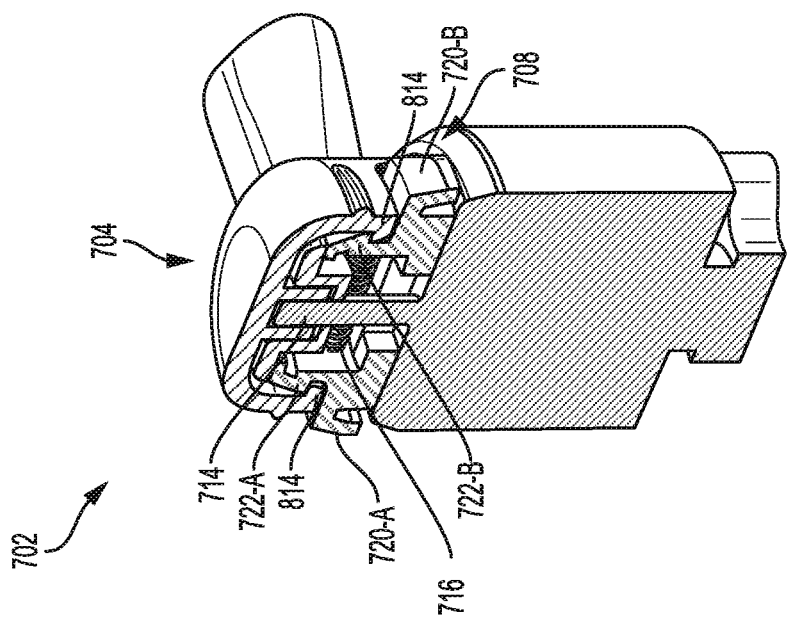
FIG. 10B is a longitudinal, cross-sectional view of the propeller assembly shown in FIG. 10A taken along line 10B.
Figure 10A:
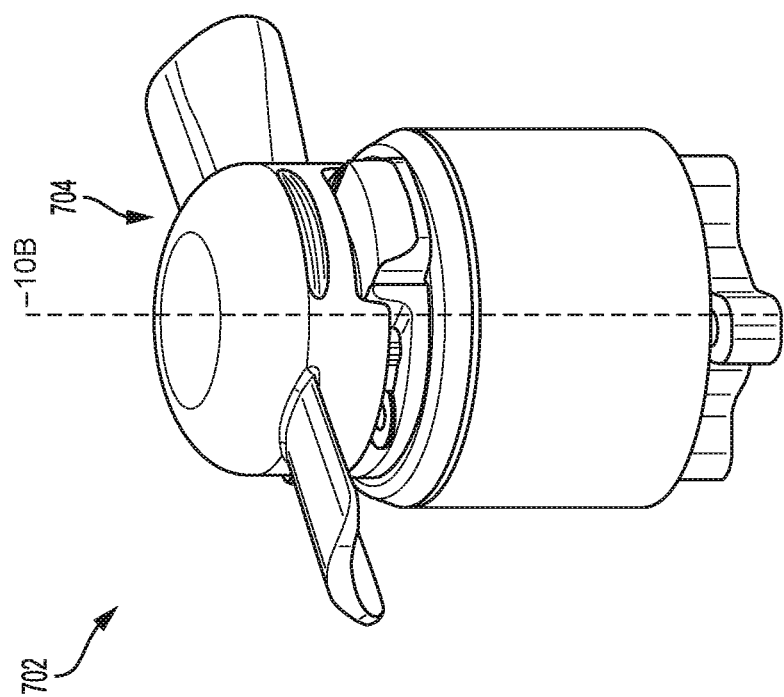
FIG. 10A is a perspective, side view illustrating full assembly of the propeller assembly shown in FIG. 7.

The propeller hub 704 includes one or more shoulders 814 (FIG. 8B) that extend inwardly towards the rotation axis Y (FIG. 7). The shoulders 814 include an angled (tapered) configuration that defines a chamfered wall 816 corresponding in configuration to the guiding surfaces 722-A, 722-B of the buttons 718-A, 718-B, respectively. To connect the propeller hub 704, a downward force is applied to cause engagement between the shoulders 814 and the guiding surfaces 722-A, 722-B. As the propeller hub 704 release moves towards the latch cap 706, the shoulders 814 engage the guiding surfaces 722-A, 722-B such that the buttons 718-A, 718-B are moved inwardly (towards the rotation axis Y) to thereby approximate the shoulders 814 and the overhangs 725-A, 725-B. Inward movement of the buttons 718-A, 718-B causes compression of the biasing members 716 and the creation of a biasing force F3 (FIG. 7) that is directed outwardly (i.e., away from the rotation axis Y). As the shoulders 814 of the propeller hub 704 pass the overhangs 725-A, 725-B, the biasing force F3 displaces the buttons 718-A, 718-B outwardly such that the shoulders 814 are positioned within the receiving spaces 727-A, 727-B (FIGS. 7, 8B) to thereby secure the propeller hub 704 in relation to the propeller hub assembly 702 (FIG. 10A, 10B).

To release and disengage the propeller hub 704 from the propeller hub assembly 702, a force F4 (FIG. 7) directed inwardly (i.e., towards the rotation axis Y) is applied to the tactile members 720-A, 720-B to displace the buttons 718-A, 718-B, thereby compressing the biasing members 716 and creating or increasing the outwardly directed biasing force F4. Inward displacement of the buttons 718-A, 718-B removes the shoulders 814 from the receiving spaces 727-A, 727-B and separates the overhangs 725-A, 725-B from the shoulders 814 such that the propeller hub 704 can be removed.

Figures 11A, 11B:
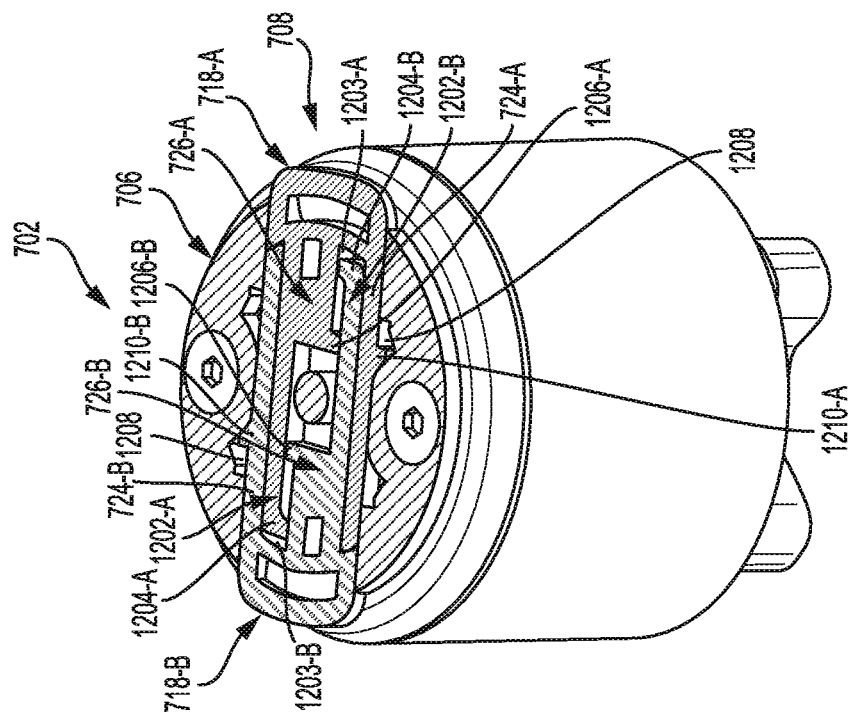
FIG. 11A is a partial, top, cross-sectional view of the propeller assembly shown in FIG. 8A taken along line 11 illustrating the propeller assembly in a normal (unbiased) configuration.
FIG. 11B is a partial, top, cross-sectional view of the propeller assembly seen in FIG. 11A in a subsequent (biased) configuration.

FIGS. 11A and 11B illustrate repositioning and cooperation of the buttons 718-A, 718-B during attachment and disengagement of the propeller hub 704 (FIG. 7). More specifically, FIG. 11A illustrates the buttons 718-A, 718-B in a normal (unbiased) initial position (e.g., prior to connection of the propeller hub 704), and FIG. 11B illustrates the buttons 718-A, 718-B in a subsequent (biased) position (e.g., after connection of the propeller hub 704).

The first button 718-A includes an end 1202-A having a projection 1204-A, and an engagement member 1206-A, each of the projection 1204-A and the engagement member 1206-A depending laterally inward towards the rotation axis Y (FIG. 7). Similarly, the second button 718-B includes an end 1202-B having a projection 1204-B, and an engagement member 1206-B, each of the projection 1204-B and the engagement member 1206-B depending laterally inward towards the rotation axis Y (FIG. 7). The connecting member 724-A and the stop member 726-A collectively define a generally U-shaped channel 1203-A that is configured and dimensioned to receive the projection 1204-B of the stop member 726-B. Similarly, the connecting member 724-B and the stop member 726-B collectively define a generally U-shaped channel 1203-B that is configured and dimensioned to receive the projection 1204-A of the stop member 726-A.

With continued reference to FIGS. 11A and 11B, a range of motion for the buttons 718-A, 718-B is defined by cooperation of the extensions 1208 of the latch cap 706 with protrusions 1210-A, 1210-B that extend outwardly from the respective connecting members 724-A, 724-B, as well as cooperation of the projections 1204 and the engagement members 1206. Specifically, the protrusions 1210-A, 1210-B extend outwardly from the connecting members 724-A, 724-B such that the protrusions 1210-A, 1210-B are configured and dimensioned for engagement with the extensions 1208 of the latch cap 706 to limit inward movement of the buttons 718-A, 718-B, as seen in FIG. 11B. To limit outward movement of the buttons 718-A, 718-B, the projection 1204-A extending inwardly from the end 1202-A of the button 718-A engages the engagement member 1206-B, and the projection 1204-B extending inwardly from the end 1202-B of the button 718-A engages the engagement member 1206-A.

With reference to FIGS. 8A and 8B, the motor shaft 714 extends through the spring latch mechanism 708 and the latch cap 706 such that the motor shaft 714 is positioned between the biasing members 716. The motor shaft 714 extends through the latch cap aperture 802 (FIG. 7) defined in the latch cap 706 into the latch cap cavity 804.

Figure 12B:
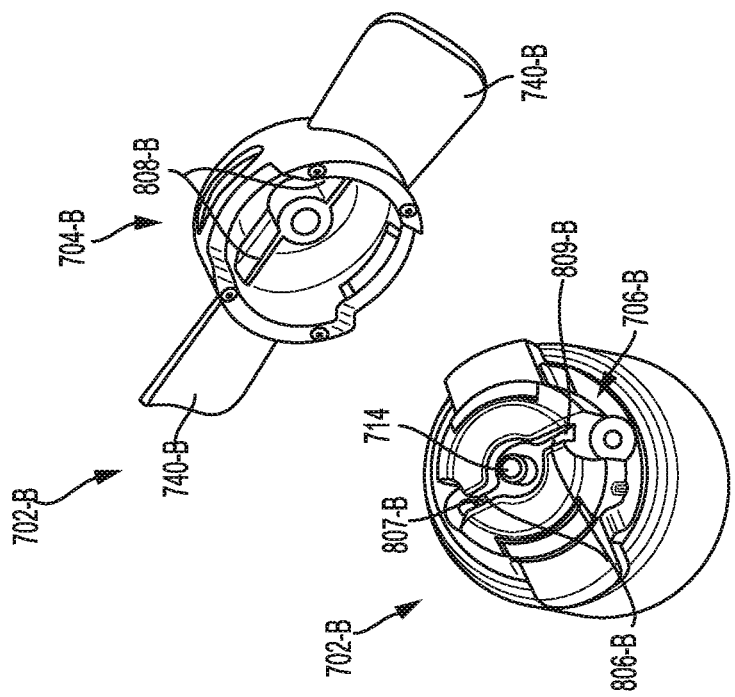
FIG. 12B is a perspective, top view of an alternate embodiment of the propeller assembly shown in FIG. 7, with the propeller detached, adapted for rotation in a second direction opposite the first direction.
Figure 12A:
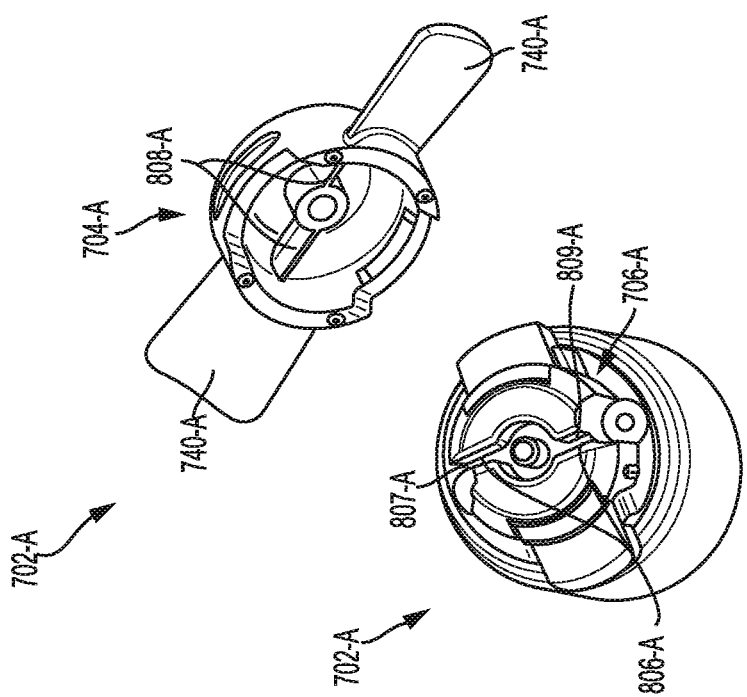
FIG. 12A is a perspective, top view of one embodiment of the propeller assembly shown in FIG. 7, with the propeller detached, adapted for rotation in a first direction.

With reference to FIGS. 12A, 12B, exemplary configurations of the propeller hub assembly 702 are illustrated together with variations on the propeller hub 704. FIG. 12A illustrates a propeller hub assembly 702-A configured for clockwise rotation of a propeller hub 704-A including propellers 740-A, and FIG. 12B illustrates a propeller hub assembly 702-B configured for counter-clockwise rotation of a propeller hub 704-B including propellers 740-B. To guard against connection of the counterclockwise propeller hub 704-B on the clockwise propeller hub assembly 702-A and connection of the clockwise propeller hub 704-A on the counter-clockwise propeller hub assembly 702-B, the configurations of the propeller hub assembly 702-A and the propeller hub 704-A differ from those of the propeller hub assembly 702-B and the propeller hub 704-B. More specifically, the propeller hub assembly 702-A includes a latch cap 706-A with a slot 806-A in a first orientation and the propeller hub 704-A includes stops 808-A having a first configuration, and the propeller hub assembly 702-B includes a latch cap 706-B with a slot 806-B in a second orientation and the propeller hub 704-B includes stops 808-B having a second configuration. As seen in FIGS. 12A and 12B, the slot 806-A in the latch cap 706-A includes opposing ends 807-A, 809-A with a first offset that matches an offset defined by the stops 808-A, and the slot 806-B in the latch cap 706-B includes opposing ends 807-B, 809-B with a second offset that matches an offset defined by the stops 808-A. The offset in the slot 806-B is opposite that off the offset in slot 806-A such that the slot 806-A receives the stops 808-A of the propeller hub 704-A and the slot 806-B receives the stops 808-B of the propeller hub 704-B.

Where certain elements of these implementations may be partially or fully implemented using known components, only those portions of such known components that are necessary for an understanding of the present disclosure have been described. Detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

As used herein, the terms "removable" and "detachable," as well as variations thereof, are used interchangeably. Additionally, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An unmanned aerial vehicle comprising:
    a motor assembly rotatable about a rotation axis, the motor assembly including:
        a motor cap defining apertures; and
    a propeller hub assembly removably engageable with the motor assembly, the propeller hub assembly including:
        a retainer configured and dimensioned for engagement with the motor cap such that rotation of the motor assembly causes corresponding rotation of the propeller hub assembly, the retainer including a bridge member connecting a pair of deflectable arms resiliently repositionable between a first position, wherein the arms are positioned for engagement with the apertures respectively, in the motor cap, and a second position, wherein the arms are positioned for disengagement with the apertures in the motor cap such that the retainer can be removed from the motor assembly, the arms being movable inwardly towards the rotation axis from the first position to the second position upon application of an external force and movable outwardly away from the rotation axis from the second position to the first position upon removal of the external force; and
        a hub member defining a recess configured and dimensioned to receive the bridge member of the retainer such that rotation of the retainer via engagement with the motor cap causes corresponding rotation of the hub member.

2. The unmanned aerial vehicle of claim 1, wherein the motor assembly includes a motor and the motor cap covers the motor.

3. The unmanned aerial vehicle of claim 1, wherein the arms each include an outwardly extending retention member configured and dimensioned for insertion into the respective aperture formed in the motor cap such that the retention members are engageable with an inner surface of the motor cap to secure the propeller hub assembly to the motor assembly.

4. The unmanned aerial vehicle of claim 3, wherein the retention members each include a chamfered outer surface and the apertures each include a corresponding chamfered inner surface, the chamfered outer surfaces of the retention members being configured and dimensioned for contact with the chamfered inner surfaces of the apertures to facilitate inward deflection of the arms and insertion of the retention members into the apertures formed in the motor cap.

5. The unmanned aerial vehicle of claim 1, wherein the hub member is a first hub member, and wherein the propeller hub assembly further includes:
    a second hub member spaced from the first hub member; and
    a spacer positioned between the first and second hub members so as to define a first receiving space and a second receiving space.

6. The unmanned aerial vehicle of claim 5, further comprising:
    a first propeller having an end portion configured and dimensioned for positioning within the first receiving space; and a second propeller having an end portion configured and dimensioned for positioning within the second receiving space.

7. The unmanned aerial vehicle of claim 5, wherein the second hub member further includes at least one stop member, the motor cap including an additional aperture configured and dimensioned to receive the stop member.

8. The unmanned aerial vehicle of claim 1, wherein the bridge member and the arms are unitarily formed.

9. A propeller hub assembly for use with an unmanned aerial vehicle including a motor assembly, the propeller hub assembly comprising:
  a retainer configured and dimensioned for engagement with the motor assembly such that rotation of the motor assembly causes corresponding rotation of the propeller hub assembly, the retainer including a bridge member extending between a pair of deflectable arms resiliently repositionable between a first position, wherein the arms are positioned for engagement with the motor assembly, and a second position, wherein the arms are positioned for disengagement with the motor assembly such that the retainer can be removed from the motor assembly, the arms being deflectable towards one another during movement from the first position to the second position upon application of an external force to the arms and movable away from one another during movement from the second position to the first position upon removal of the external force; and
  a hub member defining a recess configured and dimensioned to receive the bridge member of the retainer such that rotation of the retainer via engagement with the motor assembly causes corresponding rotation of the hub member.

10. The propeller hub assembly of claim 9, wherein the arms each include an outwardly extending retention member configured and dimensioned for engagement with an inner surface of the motor assembly.

11. The propeller hub assembly of claim 10, wherein the retention members each include a tapered configuration to facilitate engagement with the motor assembly.

12. The propeller hub assembly of claim 9, wherein the hub member is a first hub member, the propeller hub assembly further including:
  a second hub member spaced from the first hub member; and
  a spacer positioned between the first and second hub members so as to define a first receiving space and a second receiving space.

13. The propeller hub assembly of claim 9, wherein the bridge member and the arms are unitarily formed.

14. A propeller hub assembly for use with an unmanned aerial vehicle including a motor assembly, the propeller hub assembly comprising:
  a hub member including shoulders extending from an interior surface toward a rotation axis of the motor assembly and propellers extending from an exterior surface away from the rotation axis, and
  a latch member including disengagement members resiliently repositionable between a first position, wherein the disengagement members are positioned to secure the hub member to the motor assembly, and a second position, wherein the disengagement members are positioned such that the hub member can be removed from the motor assembly,
  wherein the disengagement members are movable towards one another during movement from the first position to the second position upon application of an external force to the disengagement members and movable away from one another during movement from the second position to the first position upon removal of the external force, and
  wherein the disengagement members define receiving spaces in which the shoulders of the hub member are positioned respectively, to secure the hub member to the motor assembly.

15. The propeller hub assembly of claim 14, further including:
  at least one biasing member positioned between the disengagement members, the at least one biasing member moving the disengagement members from the second position to the first position.

16. The propeller hub assembly of claim 15, wherein the at least one biasing member is configured as a spring.

* * * * *